United States Patent
Pappu et al.

(10) Patent No.: US 10,417,170 B2
(45) Date of Patent: Sep. 17, 2019

(54) DEVICE, SYSTEM AND METHOD FOR PACKET PROCESSING TO FACILITATE CIRCUIT TESTING

(71) Applicant: Intel Corporation, Santa Clara, CA (US)

(72) Inventors: Lakshminarayana Pappu, Folsom, CA (US); Suketu Bhatt, Folsom, CA (US); Satheesh Chellappan, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 137 days.

(21) Appl. No.: 15/476,506

(22) Filed: Mar. 31, 2017

(65) Prior Publication Data

US 2018/0285310 A1    Oct. 4, 2018

(51) Int. Cl.
*G06F 13/42* (2006.01)
*G06F 11/22* (2006.01)
*G06F 3/06* (2006.01)
*G06F 13/28* (2006.01)

(52) U.S. Cl.
CPC ...... *G06F 13/4291* (2013.01); *G06F 11/2215* (2013.01)

(58) Field of Classification Search
None
See application file for complete search history.

(56) References Cited

U.S. PATENT DOCUMENTS

2016/0065442 A1* 3/2016 Lechtanski ........... H04L 43/087
370/252
2017/0286359 A1* 10/2017 McGowan .......... G06F 13/4291

OTHER PUBLICATIONS

U.S. Appl. No. 15/394,666, filed Dec. 29, 2016, Pappu et al.

* cited by examiner

*Primary Examiner* — Scott C Sun
(74) *Attorney, Agent, or Firm* — Schwabe, Williamson & Wyatt P.C.

(57) ABSTRACT

Techniques and mechanisms to modify packet information in support of on-chip test functionality. In an embodiment, an integrated circuit (IC) chip includes a protocol stack to receive and process packetized information—e.g., where the processing of at least one isochronous timestamp packet (ITP) includes circuitry of the protocol stack replacing non-deterministic data of the ITP with substitute information. A deterministic nature of the substitute information enables the subsequent generation of corresponding signature information which can be used in an evaluation of circuit performance. In another embodiment, the ITP packet is modified at a transaction layer of the protocol stack, and the signature information is determined with an accumulator circuit which is part of another layer of the protocol stack.

21 Claims, 10 Drawing Sheets

DEVICE, SYSTEM AND METHOD FOR PACKET PROCESSING TO FACILITATE CIRCUIT TESTING

BACKGROUND

1. Technical Field

Embodiments of the present invention generally relate to the testing of a system and more particularly, but not exclusively, to circuit structures to provide on-chip processing of test packet information.

2. Background Art

Advances in semi-conductor processing and logic design have enabled an increase in the amount of logic that may be present on an integrated circuit (IC) device. As a result, successive generations of IC devices continue to shrink in size while supporting more storage, processing capability, communication bandwidth, etc. Some generally-available IC devices support interface standards—such as recent Universal Serial Bus (USB) standards—which provide for data rates of 5 Gigabits per second (Gbps) and even up to or exceeding 10 Gbps.

As such high-speed IC devices continue to grow the number, variety and capability, manufacturers are starting to detect problems in the reliability of high-speed links. Such problems pose significant impediments to implementing next-generation improvements to device integration. Decreased link reliability also affects related technical areas, such as the need to securely provide firmware updates. The increasing integration, speed, and functionality of such IC devices poses challenges for manufacturers who need to test, validate and launch products in a timely or cost-effective manner. Accordingly, there is expected to be an increasing premium placed on incremental improvements for providing solutions to test integrated circuitry.

BRIEF DESCRIPTION OF THE DRAWINGS

The various embodiments of the present invention are illustrated by way of example, and not by way of limitation, in the figures of the accompanying drawings and in which.

DETAILED DESCRIPTION

Embodiments discussed herein variously provide techniques and mechanisms for providing on-chip packet processing functionality to facilitate testing of circuit performance. In an embodiment, an integrated circuit (IC) chip includes a protocol stack to receive and process packetized information—e.g., where the processing of at least one type of packet includes replacing non-deterministic data in one or more fields of a packet with some substitute information. The deterministic nature of such substitute information may enable a later evaluation of information gathered after some subsequent communication of the modified packet. The information (referred to herein as "signature information") may be compared to, or otherwise evaluated based on, predetermined reference information which corresponds to known-good performance of circuit resources.

The technologies described herein may be implemented in one or more electronic devices. Non-limiting examples of electronic devices that may utilize the technologies described herein include any kind of mobile device and/or stationary device, such as cameras, cell phones, computer terminals, desktop computers, electronic readers, facsimile machines, kiosks, laptop computers, netbook computers, notebook computers, internet devices, payment terminals, personal digital assistants, media players and/or recorders, servers (e.g., blade server, rack mount server, combinations thereof, etc.), set-top boxes, smart phones, tablet personal computers, ultra-mobile personal computers, wired telephones, combinations thereof, and the like. More generally, the technologies may be employed in any of a variety of electronic devices including an IC chip having packet processing functionality described herein.

Figure 1:
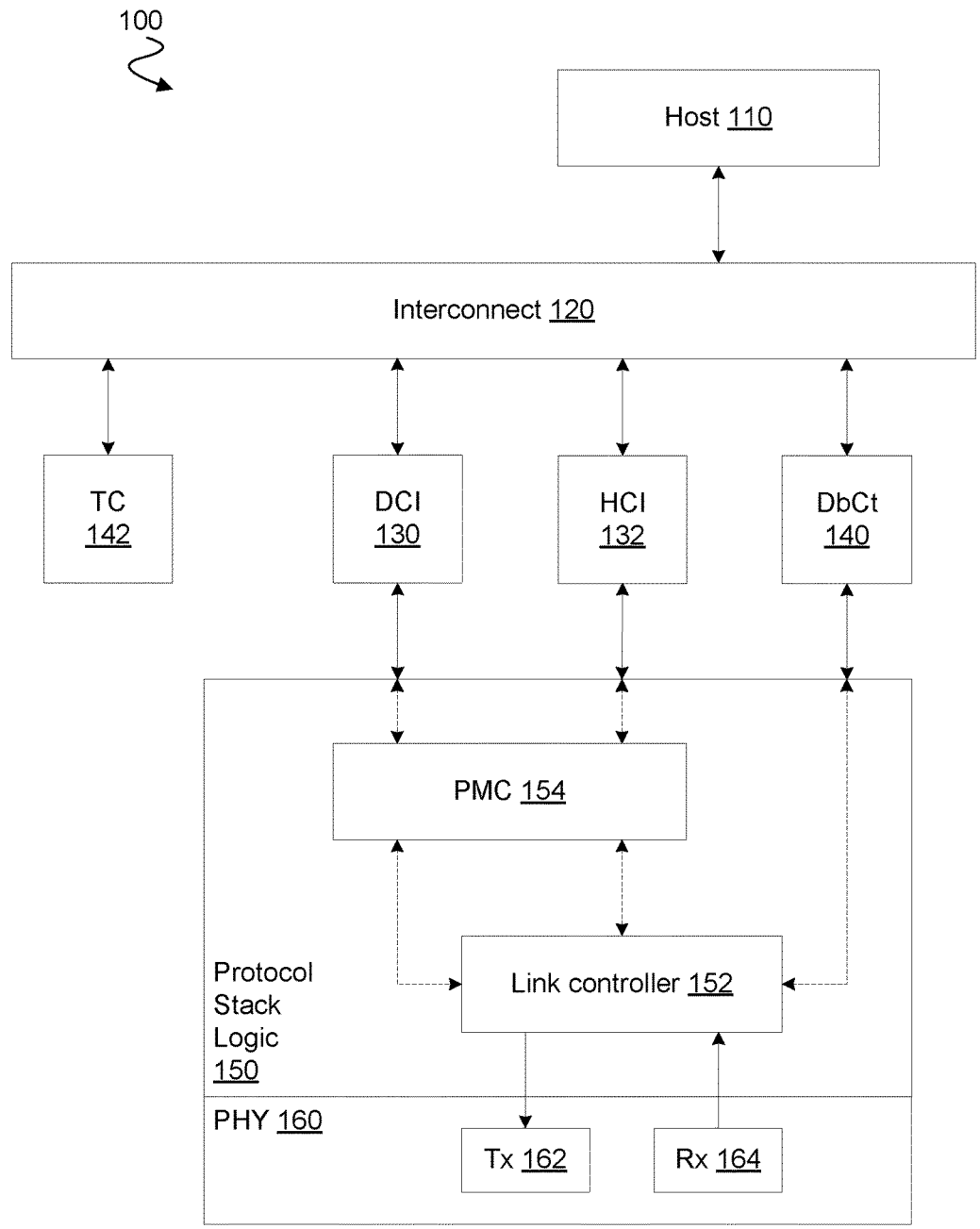
FIG. 1 is a functional block diagram illustrating elements of a system to test integrated circuitry according to an embodiment.

FIG. 1 illustrates elements of the integrated circuit (IC) chip 100 to provide test functionality according to an embodiment. IC chip 100 is one example of an embodiment wherein a protocol stack includes circuitry to detect for an isochronous timestamp packet (ITP) type of a received packet and, based on detection of the ITP type, to modify the packet by selectively substitute some information of the packet with some information. The substitute information may be a basis for the later determining of signature information for use in testing to evaluate circuit performance.

Certain features of various embodiments are described herein with reference to an IC chip which, in addition to providing ITP package manipulation functionality, also includes link control logic configured to selectively disable communication with an analog physical (PHY) layer and to emulate signals as being received, for example, from a resource other than a test controller of the IC chip (e.g., a host, a device of the IC chip or a remote agent coupled via the PHY layer). However, such description may be extended to an IC chip which additionally or alternatively includes any of a variety of other on-chip test mechanisms.

IC chip 100 may provide functionality of a system-on-chip (SoC) wherein a host 110 of IC chip 100—e.g., the host 110 including one or more processor cores—is coupled to direct of otherwise control operation of other functional components of IC chip 100. Host 110 may include a processor to execute an operating system, for example. Functional components to be controlled by host 110 may comprise one or more of a memory, input/output hub, memory controller, bus and/or any of a variety of other resources of IC chip 100. In the particular context of a host of an IC chip which controls another resource of that same IC chip, "device" is used herein to refer to the other resource which is so controlled.

Host 110 may be coupled to a device (or devices) of IC chip 100 via one or more buses and/or other interconnect structures, which are represented in FIG. 1 by the illustrative interconnect 120 shown. Such interconnect structures may support media access control (MAC) communication mechanisms, peripheral control interface (PCI) communication mechanisms and/or the like. However, the particular number and arrangement of such buses or other interconnect structures may vary according to implementation-specific details, and are not limiting on some embodiments.

In the illustrative embodiment shown, IC chip 100 includes protocol stack logic 150 and a physical layer PHY 160 to provide access between some or all resources of IC chip 100—e.g., including host 110—and other resources (not shown) that are to be coupled via PHY 160. Such other resources may be distinct from IC chip 100, although some embodiments are not limited in this regard. PHY 160 may include circuitry (e.g., including the illustrative transmit block Tx 162 and receive block Rx 164 shown) to variously transmit or receive analog signals. For example, Tx 162 and receive block Rx 164 may each include a respective analog front end (AFE) with which IC chip 100 is to variously receive or output analog communications. Operation of PHY 160 may be compatible with a high-speed serial interface standard, where "high-speed"—in this context—refers to support for a data rate of 1.5 Megabits per second (MBps) or more and, in some embodiments, four Gigabits per second (4 Gbps) or more. In some embodiments, the high-speed serial interface standard supports a data rate which is equal to or more than 5 GBps (e.g., wherein a data rate of 10 GBps is supported). For example, the high-speed serial interface standard may be one that is defined in a Universal Serial Bus (USB) interface developed by the USB Implementers Forum (USB IF). By way of illustration and not limitation, such a serial interface standard may be one defined in the USB 3.0 specification published by the USB IF on Nov. 12, 2008 or in the USB 3.1 specification released by the USB IF on Jul. 31, 2013.

Protocol stack logic 150 may include one or more protocol stacks that, for example, are each to provide some or all of the functionality of a standard Universal Serial Bus (or other) protocol stack. By way of illustration and not limitation, protocol stack logic 150 may include a first protocol stack which provides only a subset of the functionality of a standard USB protocol stack—e.g., wherein at least some other physical layer functionality of such a standard USB protocol stack is provided at PHY 160.

Certain features of various embodiments are described herein with reference to a PHY that supports communication according to a USB standard. However, such description may be extended to additionally or alternatively apply to a PHY that supports communication according to any of a variety of other high-speed serial interface standards—e.g., including a Serial AT Attachment (SATA) standard such as that defined by any of a variety of specifications released by the Serial ATA International Organization (SATA-IO). Examples of such specifications include, but are not limited to, the SATA revision 3.2 specification released August, 2013 by the SATA-IO, the SATA revision 3.0 specification released May, 2009 by the SATA-IO and the SATA revision 1.0 specification released January, 2003 by the SATA-IO, etc. In some embodiments, link control mechanisms are to operate with a PHY that supports communication according to any of a variety of Peripheral Component Interconnect Express (PCIe) standards released by the PCI Special Interest Group (PCI-SIG). Examples of such PCIe standards include the PCIe base 3.1 specification released November 2014 by the PCI-SIG, the PCIe base 3.0 specification released November 2010 by the PCI-SIG, the PCIe base 2.0 specification released January 2007 by the PCI-SIG, etc. In an embodiment, communication by the PHY is selectively enabled or disabled by link control circuitry that, for example, accommodates control mechanisms which are compatible with a PHY Interface for PCI Express (PIPE) standard.

To facilitate access to host 110, a host control interface (HCI) 132 of IC chip 100 may be coupled between PHY 160 and interconnect 120. HCI 132 may include one or more addressable ports (e.g., including a transmit port and a receive port) which, for example, are allocated to be used by host 110 for communicating information via interconnect 120. A device control interface (DCI) 130 may also be coupled between PHY 160 and interconnect 120—e.g., where DCI 130 includes one or more ports which are similarly allocated for use by one or more other devices of IC chip 100. In an embodiment, HCI 132 (or DCI 130) may comprise control logic to facilitate communication via interconnect 120 with host 110 (or with a corresponding other device of IC chip 100).

Test functionality of IC chip 100 may be provided at least in part with packet modification circuitry (PMC) 154 that is included in the protocol layer logic 150. In one example embodiment, PMC 154 is included in or coupled to circuitry of a first protocol stack, the circuitry to provide functionality of a standard transaction layer—e.g., where such functionality is defined by a USB specification. PMC 154 may be coupled to receive a first packet that, for example, is provided to protocol stack logic 150 from one of HCI 132 or DCI 130. PMC 154 may detect that the first packet conforms to a standard ITP format—e.g., where PMC 154 identifies a value in a Type field of the first packet. Based on detection of the first packet's ITP packet type, PMC 154 may selectively replace some information (e.g., only a subset of all information) in the first packet with substitute values. The replaced information may, for example, include a value in a time delta field of the first packet, wherein the time delta field is to represent an amount of time that has elapsed since a time of receipt for some earlier packet. Alternatively or in addition, the replaced information may include a value in a bus interval counter field of the first packet, wherein the bus interval counter field is used to count some units of information (e.g., microframes) being communicated with the first protocol stack.

The replacement value, or values, that are substituted into the first packet may be predetermined or otherwise determinable by other logic (referred to herein as "accumulation logic" or "accumulation circuitry") that is to generate signature information after a subsequent communication of the modified first packet at least through some one or more other layers of the first protocol stack. For example, PMC 154 may output the modified first packet for further communication in (and in some embodiments, through) other layers of the first protocol stack comprising PMC 154.

IC chip 100 may further include accumulation logic (not shown) to receive, and retrieve information from, the modified first packet—e.g., wherein the retrieved information includes a substitute value provided by PMC 154. Signature information, generated based on the retrieved information, may be subsequently processed to evaluate performance of at least part of the first protocol stack. The accumulation logic may, for example, be included in a lower layer of the first protocol stack—e.g., as part of circuitry that is to provide functionality of a standard USB physical layer. In some embodiments, multiple instances of accumulation logic may be variously located at multiple points along a communication path through protocol stack logic 150. Alternatively or in addition, accumulation logic may reside outside of protocol stack logic 150—e.g., in the illustrative test controller TC 142 shown. In substituting non-deterministic values of an ITP packet, some embodiments variously provide additional or alternative sources of deterministic information to serve as a basis for evaluating circuit performance.

Although some embodiments are not limited in this regard, emulation functionality of IC chip 100 may also be provided at protocol stack logic 150. Such emulation functionality may, for example, enable representation of signals as being received from a source other than protocol stack logic 150 (e.g., other than a resource of IC chip 100). Alternatively or in addition, emulation may include or result in a redirecting and/or other modification of a command, request or other message—e.g., where communication of the message is modified to target an alternative resource of IC chip 100.

Emulation functionality of protocol stack logic 150 may be provided with one or more controllers (e.g., including the illustrative link controller LC 152 shown) each coupled between PHY 160 and respective interfaces with interconnect 120. LC 152 may be coupled, for example, to interconnect 120 via HCI 132 and further coupled to Tx 162 and Rx 164. In such an embodiment, LC 152 may be further coupled to interconnect 120 via one or more other communication paths. For example, interconnect 120 may be further coupled to 52 via DCI 130—e.g., in parallel with the connection to interconnect 120 via HCI 132. In some embodiments, IC chip 100 includes a debug controller DbCt 140 coupled between interconnect 120 and protocol stack logic 150. DbCt 140 may include circuitry coupled to communicate with other resources of IC chip 100, wherein DbCt 140 accumulates debug information based on such communications. In such an embodiment, LC 152 may be coupled to interconnect 120 via an interface with DbCt 140—e.g., instead of LC 152 being coupled to interconnect 120 via DCI 130.

Link controller 152 may provide functionality to snoop, intercept or otherwise detect signals received from interconnect 120. Based on such detection, LC 152 may determine whether to relay or otherwise allow communication of such signals to PHY 160 (e.g., to Tx 162) or whether to instead perform an emulation in lieu of such communication with PHY 160. By way of illustration and not limitation, IC chip 100 may further comprise the test controller TC 142 operable to configure a test mode that, for example, is to be distinguished from another mode (referred to herein as a "functional node") which supports general purpose operation including communications via PHY 160. For example, LC 152 may receive from TC 142 one or more control signals indicating that the test mode is to be configured. The one or more control signals may be communicated via a sideband channel (not shown) or, for example, via interconnect 120.

Configuration of the test mode may include LC 152 disabling one or more paths of communication with PHY 160. For example, LC 152 may include or couple to any of a variety of switches, power gate circuits, clock gate circuits and/or other such mechanisms to selectively enable or disable communication between one of DCI 130, HCI 132, DbCt 140 and one or both of Tx 162, Rx 164. In some embodiments, configuration of a test mode includes enabling communication along an alternative path (for brevity, referred to herein as a "loopback path") between two interfaces which are each coupled between LC 152 and interconnect 120. For example, a loopback path may enable communication via LC 152 between DCI 130 and HCI 132. In an embodiment wherein IC chip 100 includes DbCt 140, an additional or alternative loopback path may be configured to facilitate communication between HCI 132 and DbCt 140 via LC 152 (or some other link controller of protocol stack logic 150). A loopback path may be entirely in a digital domain—e.g., wherein any signals communicated along such a loopback path comprise digital information and (for example) are not converted to or from corresponding analog signals during communication along the loopback path.

In some embodiments, a loopback path includes or couples to circuitry which enables the accumulation of information (referred to herein as "signature information") which is indicative of the integrity of a given resource of the IC chip—e.g., where the resource is involved in an earlier communication on which the signature information is based. By way of illustration and not a limitation, communications sent from (or to be sent to) TC 142 along a loopback path may emulate host 110 to DCI 130 (and in some embodiments, to a device of IC chip 100 that is controlled by host 110 via DCI 130). Alternatively or in addition, a communication sent from (or to be sent to) TC 142 along a loopback path may enable emulation of a device other than TC 142 to HCI 132 (and in some embodiments, to host 110). Such loopback communications may result in the generation of signature information indicating a test result for evaluating one or more components of IC chip 100.

In some embodiments, emulation processes with LC 152 additionally or alternatively include operations to convert memory mapping information and/or a memory access requests based on such memory mapping information. For example, LC 152 may convert a request to access one memory resource into a request which instead accesses an alternative resource. Such request conversion may be transparent to a requesting agent (e.g., where the requesting agent is host 110 or another device of IC chip 100 or, alternatively, an external agent which is coupled to protocol stack logic 150 via PHY 160). Accordingly, protocol stack logic 150 may provide to some device which is coupled to IC chip 100 (and/or to a resource of IC chip 100) an emulated memory mapping other than an actual mapping for memory resources of IC chip 100. Correspondingly, protocol stack logic 150 may provide to host 110 (or some other resource of IC chip 100) an emulation of a device as requesting one memory resource, where the device in fact issued a request which targeted a different (or even a non-existent) resource. Certain features of various embodiments are described herein with reference to a link controller which operates to perform emulation in support of test and/or debug processes. However, such description may be extended to apply to a link controller which additionally or alternatively emulates memory mapping and/or memory requests.

Figure 2:
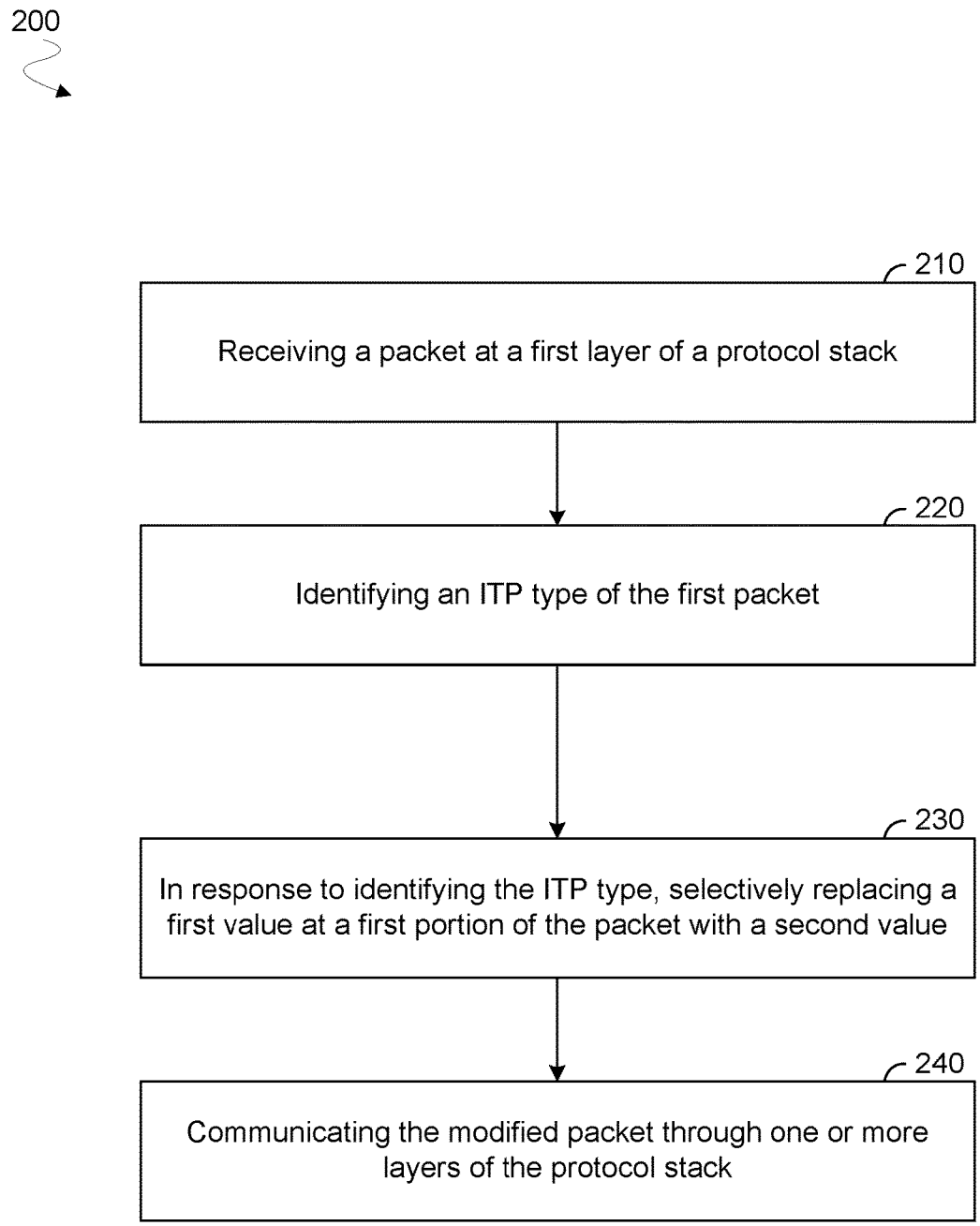
FIG. 2 is a flow diagram illustrating elements of a method for testing integrated circuitry according to an embodiment.

FIG. 2 illustrates elements a method 200 to operate an IC chip according to an embodiment. Method 200 is one example of a method that may provide on-chip test functionality—e.g., wherein circuitry to perform method 200 has some or all of the features of IC chip 100.

Method 200 may comprise, at 210, receiving a first packet at a first layer of a first protocol stack. The first packet may, for example, be received at 210 as part of communications which are compatible with a USB standard (e.g., set forth in the USB 3.0 specification or the USB 3.1 specification).

Such communications may take place during a test mode of the IC chip, although some embodiments are not limited in this regard. Alternatively or in addition, multiple packets including the first packet may be communicated with the IC chip as part of an exchange that, for example, is to verify a firmware version of the IC chip. Method 200 may further comprise, at 220, identifying an isochronous timestamp packet (ITP) type of the first packet received at 210. For example, the first layer may be a transaction layer of the first protocol stack, wherein circuitry of the first layer performs the identifying at 220 by accessing a Type field of the first packet.

In response to identifying the ITP type, method 200 may perform, at 230, selectively replacing a first value at a first portion of the first packet with a second value to generate a modified first packet. For example, the first portion may include a time delta field and/or a bus interval counter field, one of which includes the first value. In some embodiments, respective values of multiple fields—e.g., including both a time delta field and a bus interval counter field—may be variously replaced with respective substitute values at 230. In some embodiments, the identifying at 220 and/or the replacing at 230 is based on a currently-configured test mode of the IC chip—e.g., wherein the test mode configures a loopback path as described herein. For example, a functional mode of the IC chip may disable at least circuitry which performs the replacing at 230.

Method 200 may further comprise, at 240, communicating the modified first packet through one or more layers of the first protocol stack. For example, the modified first packet may be communicated at 240 at least to circuitry of the first protocol stack other than any digital-to-analog converter of analog PHY circuitry. The communicating at 240 may, for example, include sending the modified first packet—via a loopback path through—through protocol stack circuitry, control interface circuitry and interconnect circuitry of the IC to a test controller (such as TC 142) of the IC chip.

In some embodiments, method 200 additionally or alternatively comprises test and evaluation processes and/or other operations (not shown) using a packet which has been modified as described herein. By way of illustration and not limitation, method 200 may further include receiving the modified first packet at a second layer of the first protocol stack and generating, at the second layer, signature information based on the second value. In such an embodiment, the second layer may, for example, provide physical layer functionality of a standard USB protocol stack—e.g., wherein the signature information is based on processing of the modified first packet prior to any digital-to-analog conversion of the modified first packet. A performance of the first protocol stack may be subsequently evaluated based on the signature information—e.g., based on reference information including the substituted value itself or some other information which is based on the substituted value. The evaluation of signature information may include operations that, for example, are adapted from conventional techniques to detect whether packet information (e.g., relative to an expected state of such packet information) is indicative of a circuit test failure. A generating of signature information may additionally or alternatively be performed by test circuitry, such as TC 142, which is external to protocol stack logic of the IC chip.

Alternatively or in addition, method 200 may comprise receiving a second packet at a second protocol stack of the IC chip (e.g., another stack of protocol stack logic 150). Such a second packet may, for example, represent a reply to the modified first packet. In an embodiment, the second protocol stack includes its own packet modification circuitry or may share functionality of packet modification circuitry with the first protocol stack. In such an embodiment, the second protocol stack may perform processing similar to that of operations 210, 220, 230, 240—e.g., including a transaction (or other) layer of the second protocol stack identifying a packet type of the second packet and, based on the packet type, selectively replacing a value of a portion of the second packet a substitute value to generate a modified second packet. In such an embodiment, the modified second packet may then be communicated at least through one or more layers of the second protocol stack, as described herein with reference to the modified first packet.

Figure 3:
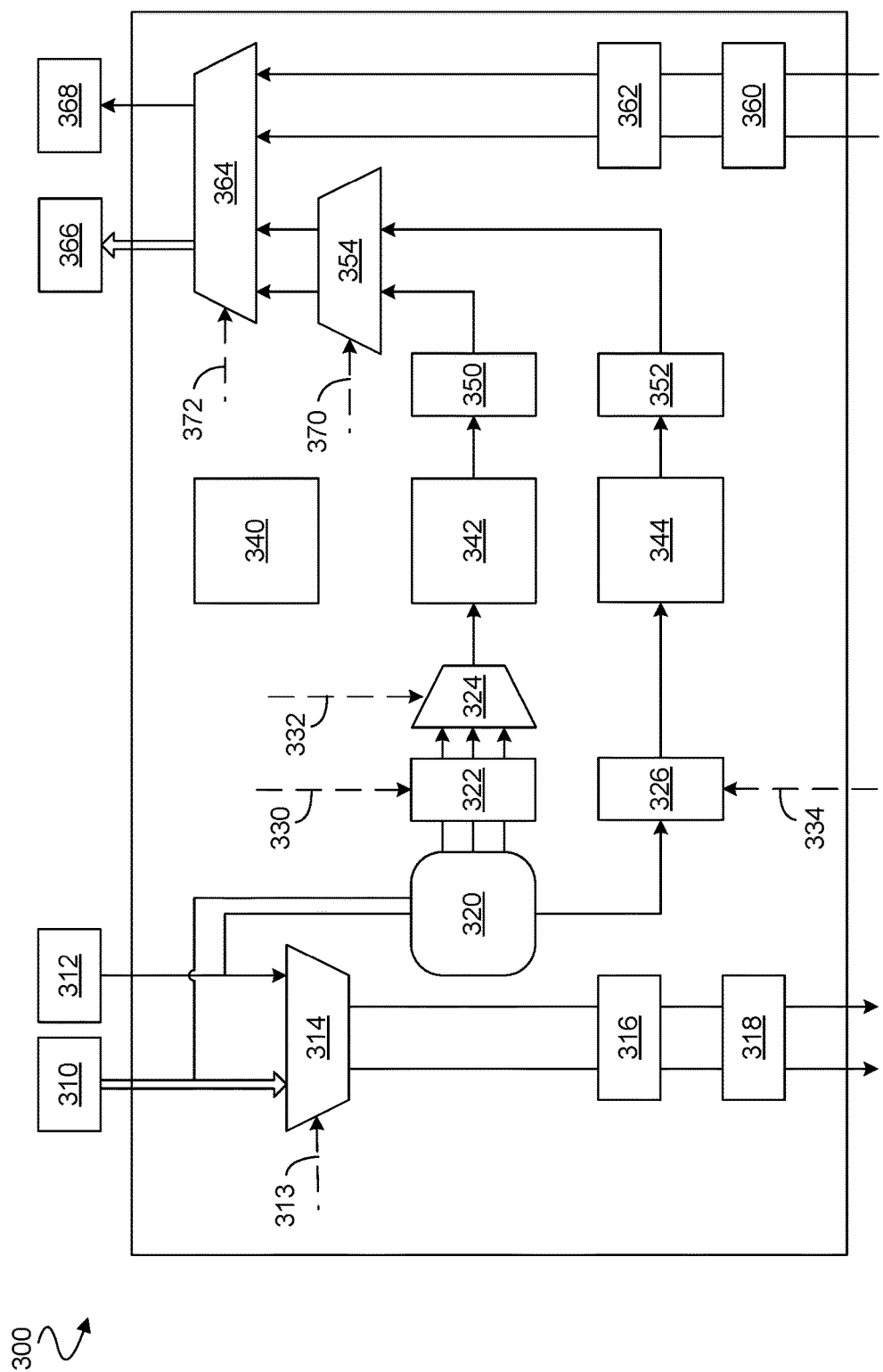
FIG. 3 is a functional block diagram illustrating elements of a link controller to communicate test information according to an embodiment.

FIG. 3 illustrates elements a link controller 300 to determine communication with a PHY layer according to an embodiment. Link controller 300 may comprise some or all of the features of link controller 152, for example.

Link controller 300 may provide a configurable loopback path that, in some embodiments, operates in combination with packet manipulation functionality such as that of PMC 154. For example, link controller 300 may be operated in conjunction with processes of method 200. However, an IC chip may omit such configurable loopback path, in other embodiments.

Link controller 300 may support coupling to operate between a PHY layer (e.g., PHY 160) of an IC chip and one or more interfaces with an interconnect architecture of the IC chip—e.g., wherein the interconnect architecture includes one or more buses coupled to host circuitry and any of a variety of other circuit resources of the IC chip. During a functional mode of the IC chip, the host may variously control such other circuit resources—e.g., where such control is to facilitate communication by the IC chip via the PHY layer thereof. During another mode of the IC chip (e.g., a test mode), link controller 300 may redirect and/or otherwise modify the communication of signals—e.g., to emulate an agent and/or to emulate a request to access a resource.

In an embodiment, link controller 300 includes circuitry to couple to an input 310 and an output 366 each to communicate with a host control interface (such as HCI 132)—e.g., via transaction layer circuitry including packet modification logic as described herein. Link controller 300 may also include circuitry to couple to a device/debug input 312 and a device/debug output 368 which, for example, are each to communicate with a device control interface (such as DCI 130) or each of an interface of a debug controller (such as DbCt 140)—e.g., via transaction layer circuitry including packet modification logic as described herein. Input 310 may provide to link controller 300 signals from a host of the IC chip—e.g., host 110—or from another agent, such as a test controller, which emulates the host. Device/debug input 312 may provide to link controller 300 signals from a device of the IC chip (other than the host) or from another agent, such as a test controller, which emulates such a device. Signals provided via one of input 310 or device/debug input 312 may communicate a packet that, for example, was previously modified by transaction layer logic—e.g., according to method 200.

During functional mode operation of link controller 300, signals received from one of input 310 and device input 312 are to be communicated to transit circuitry of a PHY layer. Alternatively or in addition, either of output 366 and device/debug output 368 may, during functional mode operation, receive from link controller 300 respective signals provided via receiver circuitry of the PHY layer. For example, a transmit functional path 316 and a receive functional path 362 of link controller 300 may facilitate various communications with, respectively, a PHY transmit block and a PHY receive block (e.g., Tx 162 and Rx 164). A multiplexer 314 may be coupled to selectively enable communication from either of input 310 and device/debug input 312, via transmit functional path 316, to the PHY transmit circuitry. Similarly, a multiplexer 364 may be coupled to selectively enable communication from the PHY receiver circuitry, via receive functional path 362, to either of output 366 and device/debug output 368.

By contrast, a test mode of link controller 300 may include selectively disabling some or all communication via one or each of transmit functional path 316 and receive functional path 362. For example, link controller 300 may include or couple to transmit isolation logic 318 comprising switches and/or other circuitry operable to selectively isolate transmit functional path 316 from the PHY. Alternatively or in addition, link controller 300 may similarly include receive isolation logic 360 operable to selectively isolate receive functional path 362 from the PHY. A functional mode of link controller 300 may configure transmit isolation logic 318 and receive isolation logic 360 to enable respective communications via transmit functional path 316 and receive functional path 362. An alternative mode (for example, a test mode) may instead disable communication with one or both of 316 and receive functional path 362, and/or may selectively enable communication via at least one loopback path. In the illustrative embodiment shown, link controller 300 provides a first loopback path to communicate information between input 310 and device/debug output 368 and a second loopback path to communicate information between device/debug input 312 and output 366. However, link controller 300 may have more, fewer and/or differently configured loopback paths, in different embodiments.

Communication via a loopback path may be based at least in part on circuitry of link controller 300 (such as the illustrative state machine 320 shown) snooping or otherwise detecting first signals received via one of input 310 and input 312. State machine 320 (or other such circuitry) may determine that the received first signals are associated with an instance of a test mode and, based on such detecting, may provide to a loopback path second signals which are based on such first signals. For example, operation of state machine 320 may result in data of the first signals being reformatted or otherwise converted into data of the second signals. Alternatively or in addition, state machine 320 may generate one or more control signals to subsequently emulate a reception of the second signals via receive functional path 362 (and from the PHY receiver coupled thereto).

In the illustrative embodiment shown, the first loopback path comprises an in-series arrangement including latch logic 322, multiplexer 324, host control first-in-first-out (FIFO) buffer 342 and latch logic 350. The first loopback path may be coupled to receive information from a state machine 320 which is based on signals provided by input 310. Latch logic 322, 350 and host control FIFO buffer 342 may coordinate the timing of communication along the first loopback path—e.g., where a system clock signal 330 is coupled to operate one or both of latch logic 322, 350. Multiplexer 324, coupled between latch logic 322 and host control FIFO buffer 342, may determine an amount and/or order of information that is to be communicated from state machine 320 through the first loopback path. For example, multiplexer 324 may receive via latch logic 322 sets of signals each corresponding to a different respective device of the IC chip. In such an embodiment, multiplexer 324 may selectively pass information related to only one such device, as determined at least in part by a control signal 332 indicating a particular device that is to receive such information via device/debug output 368. Control signal 332 may, for example, be the same as, or otherwise based on, a signal 313 to control multiplexing by multiplexer 314.

Alternatively or in addition, a second loopback path provided by link controller 300 may comprise an in-series arrangement including latch logic 326, device control FIFO buffer 344 and latch logic 352. The second loopback path may be coupled to receive information from state machine 320 which is based on signals provided by input 312. Latch logic 326, 352 and device control FIFO buffer 344 may coordinate the timing of communication along the second loopback path—e.g., where clock signal 334 is coupled to operate one or both of latch logic 326, 352.

In one embodiment, another multiplexer 354 is coupled between multiplexer 364 and each of the first loopback path and the second loopback path. Multiplexer 354 may provide the second signals to multiplexer 364—e.g., in response to a control signal 370 indicating which of the first loopback path and the second loopback path is to output the second signals. Control signal 370 may be provided by state machine 320 or, for example, from a test controller such as TC 142. Another control signal 372 (e.g., generated by state machine 320 or an external test controller) may selectively operate multiplexer 364 to provide an output from link controller 300. For example, in addition to multiplexing on the output side between output 366 and device/debug output 368, multiplexer 364 may multiplex on the input side between loopback path signal lines and signal lines coupled to receive functional path 362.

In some embodiments, communication via a loopback path is based on or otherwise determines reference information that, for example, may be used in test and/or debug evaluation processes. For example, link controller 300 may include or couple to a repository 340 (e.g., including a non-volatile memory) to store reference information to be evaluated or which is to be a basis for evaluation. For example, link controller 300 may write to repository 340 signature information which includes (or otherwise represents a state of) data, metadata and/or control information in the loopback path. Alternatively or in addition, repository 340 may store fiducial data with which link controller 300 (or a test controller coupled thereto) might evaluate such signature information. Signature information may be compared or otherwise evaluated based on fiducial data to determine whether one or more circuit components of the IC chip have failed to satisfy one or more performance metrics. In some embodiment, repository 340 may additionally or alternatively store memory mapping information to facilitate the conversion of a memory request—e.g., by state machine 320.

Figure 4:
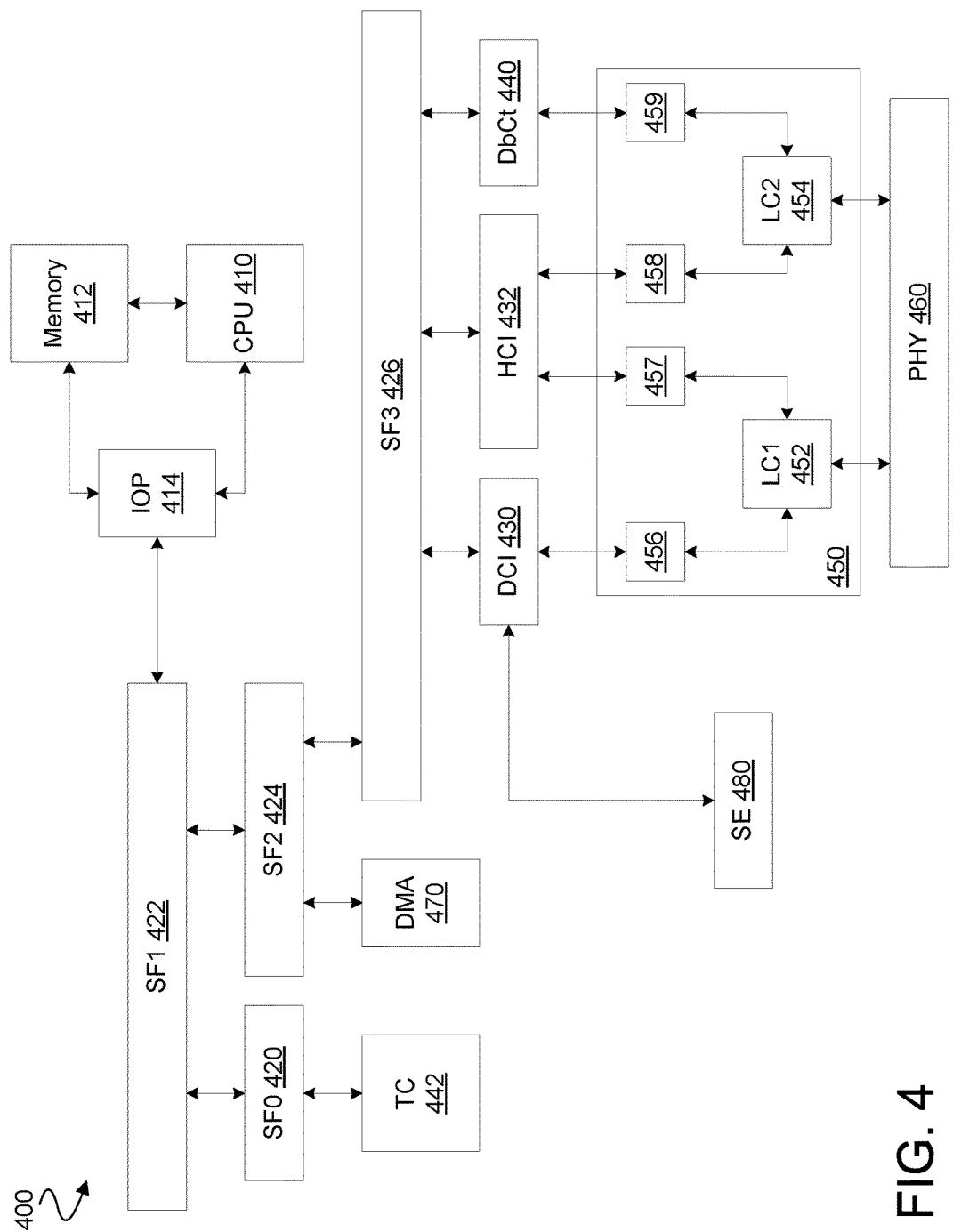
FIG. 4 is a functional block diagram illustrating elements of a system to test integrated circuitry according to an embodiment.

FIG. 4 illustrates elements an IC chip 400 to provide packet modification and on-chip test functionality according to an embodiment. IC chip 400 may include some or all of the features of IC chip 100, for example. Method 200 may, for example, be performed with circuitry such as that of IC chip 400. In the illustrative embodiment shown, IC chip 400 includes a central processing unit (CPU) 410, protocol stack logic 450, PHY 460, test controller TC 442, device control interface DCI 430, host control interface HCI 432 and debug controller DbCt 440—e.g., which, respectively, correspond functionally to host 110, protocol stack logic 150, PHY 160, TC 142, DCI 130, HCI 132 and DbCt 140.

IC chip 400 may include one or more devices to be variously controlled directly or indirectly by one or more host processes executed with CPU 410. By way of illustration and not limitation, such one of more devices may include a memory 412, input/output processor IOP 414, and direct memory access circuitry DMA 470. However, IC chip 400 may include more, fewer and or different devices to be controlled by CPU 410, in different embodiments.

An interconnect architecture (e.g., corresponding functionally to interconnect 120) may variously couple CPU 410 and devices of IC chip 400 to PHY 460. Such an interconnect architecture may include, for example, one or more scalable fabrics such as the illustrative scalable fabrics SF0 420, SF1 422, SF2 424 and SF3 426 shown. The particular number and configuration of such one or more scalable fabrics may vary in different embodiments.

To facilitate circuit testing, one or more protocols stacks of protocol stack logic 450 may each include a respective packet modulation circuit to selectively modify ITP packets by replacing non-deterministic information with substitute information which can be used to generate signature information for circuit testing. By way of illustration and not limitation, protocol stacks of protocol stack logic 450 may include respective PMCs 456, 457, 458, 459 coupled to variously communicate packets with respective DCI 430, HCI 432 and/or DbCt 440. IC chip 400 may include more, fewer and/or differently configured packet modulation circuits, in other embodiments. In some embodiments, protocol stack logic 450 further includes multiple link controllers each coupled between PHY 460 and one of the scalable fabrics (e.g., SF3 426). For example, to facilitate emulation functionality according to an embodiment, a link controller LC1 452 of protocol stack logic 450 may be coupled to PHY 460 and further coupled to each of DCI 430 and HCI 432. Another link controller LC2 454 of protocol stack logic 450 may be additionally or alternatively coupled to PHY 460 and further coupled to each of DCI 430 and DbCt 440. One or both of LC1 452 and LC2 454 may have respective features of link controller 300, for example.

Although some embodiments are not limited in this respect, an IC chip may include a security engine which is to function as, or provide access to, a sink or source of packets such as those which may be processed according to method 200. In the example embodiment of IC chip 400, a security engine SE 480 may be coupled—e.g., via DCI 430—to transmit and/or receive packets with protocol stack 450. SE 480 may include logic (e.g., including hardware, firmware, and/or software resources) which, for example, are protected from access by an operating system or other process executing on CPU 410. SE 480 may participate in an exchange that, for example, is to verify a version of firmware that is stored at memory 412. In such an embodiment, an ITP packet of the communication may be modified by one of PMCs 456, 457, 458, 459—e.g., where signature information subsequently accumulated based on the modified ITP packet facilitates testing of protocol stack logic 450.

Figure 5A:
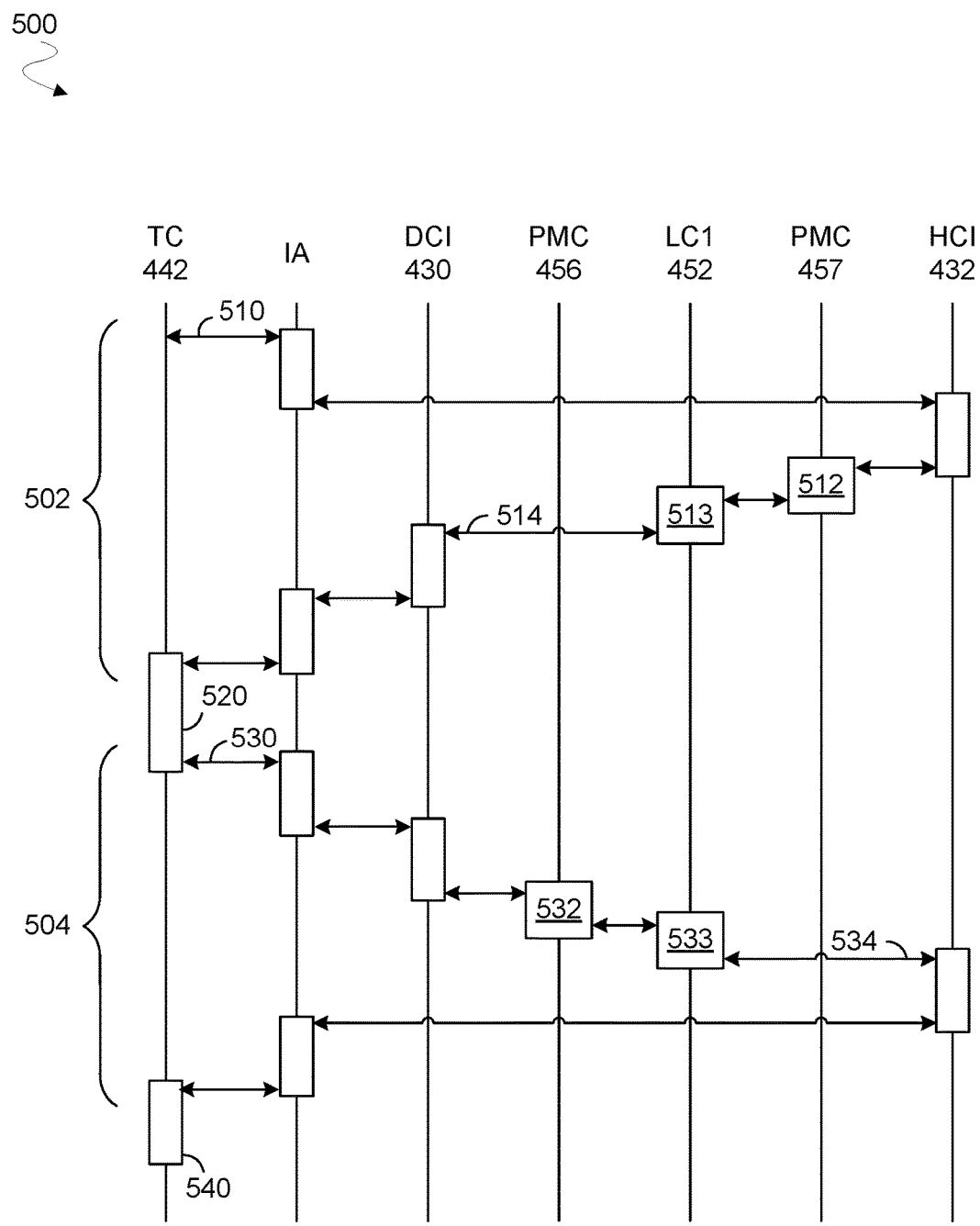
FIGS. 5A, 5B are swim-lane diagram illustrating elements of respective communication sequences each to provide test functionality according to a corresponding embodiment.
Figure 5B:
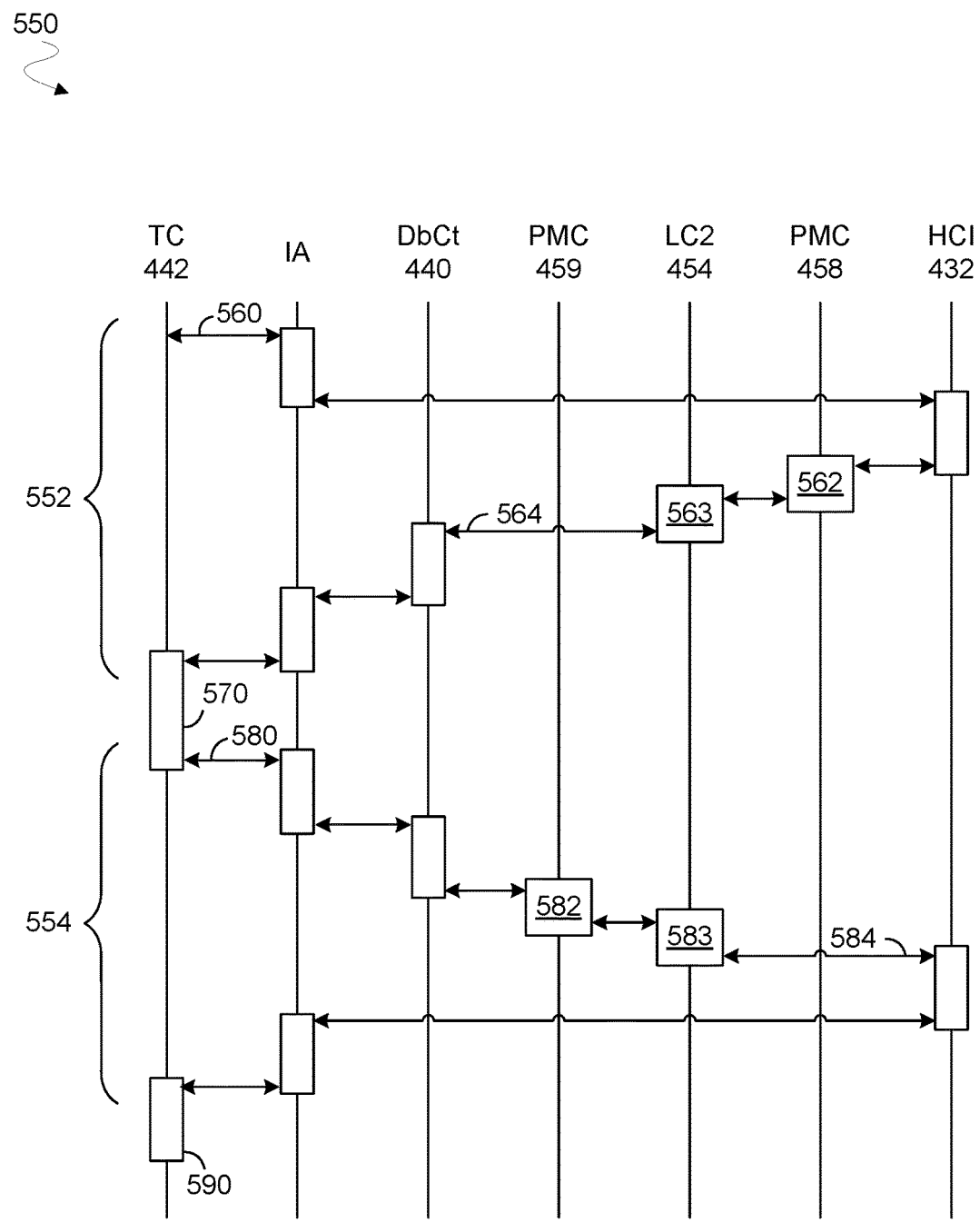

FIGS. 5A, 5B show respective exchanges 500, 550 to variously provide test each according to a corresponding embodiment. One or both of exchanges 500, 550 may include operations of method 200, for example. To illustrate certain features of various embodiments, exchange 500 is shown as taking place with resources of IC chip 400. However, other exchanges may be similarly performed at IC chip 100 and/or any of a variety of other devices according to different embodiments.

In the illustrative embodiment shown in FIG. 5A, exchange 500 includes a transaction 502 wherein TC 442 sends signals 510 to LC1 452 via the interconnect architecture IA (comprising SF0 420, SF1 422, SF2 424 and SF3 426), HCI 432 and PMC 457. PMC 457 may perform processing 512 to modify an ITP packet which is communicated by signals 510—e.g., where such processing 512 is according to method 200. LC1 452 may perform additional processing 513 based on signals 510 (as modified by processing 512) to generate other signals 514—e.g., wherein a test mode of LC1 452 results in signals 514 being generated and looped back to the interconnect architecture IA via DCI 430. The signals 514 may emulate—e.g., to DCI 430, to the interconnect architecture IA and/or the like—a communication received from a host process of CPU 410. Alternatively, signals 514 may emulate an output by a receiver unit of PHY 460. In some embodiments, accumulation logic (not shown) of protocol stack logic 450 snoops or otherwise detects signals 514 to generate signature information to subsequently used in circuit test evaluations. Alternatively or in addition, signature information may be generated by TC 442 after receipt of signals 514 via the IA.

In some embodiments, exchange 500 further comprises another transaction 504 wherein TC 442 sends signals 530 to LC1 452 via interconnect architecture IA, PMC 456 and DCI 430. The signals 530 may be generated, for example, based on processing 520 of signals 514 (e.g., in response to receipt and, in some embodiments, test processing thereof). PMC 456 may perform processing 532 to modify an ITP packet which is communicated by signals 530—e.g., where such processing 532 is according to method 200. LC1 452 may perform additional processing 533 based on signals 530 (as modified by processing 532) to generate other signals 534—e.g., wherein a test mode of LC1 452 results in signals 534 being generated and looped back to the interconnect architecture IA via HCI 432. The signals 534 may emulate to HCI 432 (or other circuitry of IC chip 400) a communication received from a device of IC chip 400 (such as DMA 470). Alternatively, signals 534 may emulate an output by a receiver unit of PHY 460. Subsequent processing 540 of signals 534 by TC 442 may include evaluation processing to determine—e.g., based on signature information—whether one or more resources of IC chip 400 which participated in transaction 502 and/or transaction 504 fail to meet one or more performance criteria.

In the illustrative embodiment shown in FIG. 5B, exchange 550 includes a transaction 552 wherein TC 442 sends signals 560 to LC2 454 via interconnect architecture IA, HCI 432 and PMC 458. PMC 458 may perform processing 562 to modify an ITP packet which is communicated by signals 560—e.g., where such processing 562 is according to method 200. LC2 454 may perform additional processing 563 based on signals 560 (as modified by processing 562) to generate other signals 564—e.g., wherein a test mode of LC2 454 results in signals 564 being generated and looped back to the interconnect architecture IA via DbCt 440. The signals 564 may emulate—e.g., to DbCt 440, to the interconnect architecture IA and/or the like—a communication received from a host process of CPU 410. Alternatively, signals 564 may emulate an output by a receiver unit of PHY 460.

In some embodiments, exchange 550 further comprises another transaction 554 wherein TC 442 sends signals 580 to LC2 454 via interconnect architecture IA, DbCt 440 and PMC 459. The signals 580 may be generated, for example, based on processing 570 of signals 564 (e.g., in response to receipt and, in some embodiments, test processing thereof). PMC 459 may perform processing 582 to modify an ITP packet which is communicated by signals 580—e.g., where such processing 582 is according to method 200. LC2 454 may perform additional processing 583 based on signals 580 (as modified by processing 582) to generate other signals 584—e.g., wherein a test mode of LC2 454 results in signals 584 being generated and looped back to the interconnect architecture IA via HCI 432.

LC2 454 may perform processing 582 based on signals 580 to generate other signals 584—e.g., wherein a test mode of LC2 454 results in signals 584 being generated and looped back to the interconnect architecture IA via HCI 432. The signals 584 may emulate to HCI 432 (or other circuitry of IC chip 400) a communication received from a device of IC chip 400 (such as DMA 470). Alternatively, signals 584 may emulate an output by a receiver unit of PHY 460. Subsequent processing 590 of signals 584 by TC 442 may include evaluation processing to determine whether DbCt 440 (and/or one or more resources of IC chip 400 which participated in transaction 502 or transaction 504) fail to meet one or more performance criteria.

Figure 6:
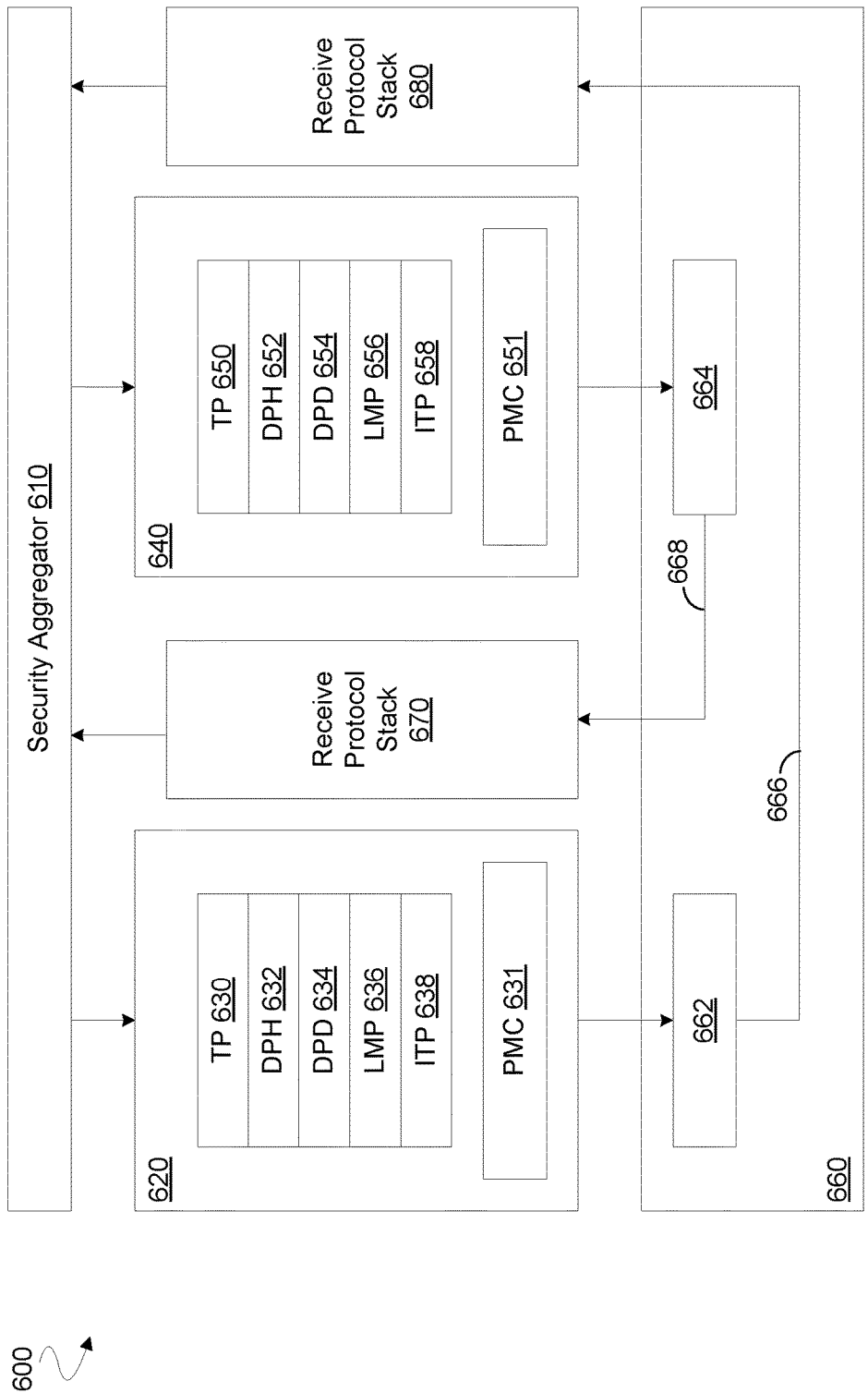
FIG. 6 is a functional block diagram illustrating elements of a test architecture according to an embodiment.

FIG. 6 illustrates elements an IC chip 600 to provide test functionality according to an embodiment. IC chip 600 may include some or all of one of IC chips 100, 400, for example. In an embodiment, test processing performed with IC chip 600 may be part of, or based on, method 200. In the illustrative embodiment shown, IC chip 600 includes a security aggregator 610 that collects, calculates or otherwise determines signature information based on state of packet information. Security aggregator 610 may be coupled to circuitry which is to communicate different types of data packet information. In such an embodiment, security aggregator 610 may collect various types of signature information each corresponding to a different respective type of data packet information. By way of illustration and not limitation, security aggregator 610 may be variously coupled to transmit protocol stack 620 and receive protocol stack 670 (e.g., each to communicate with HCI 132), to a link controller 660 and further to transmit protocol stack 640 and receive protocol stack 680 (e.g., each to communicate with DCI 130 or each to communicate with DbCt 140).

One or more protocol stacks of IC chip 600 may include packet modification circuitry to replace non-deterministic information of an ITP according to an embodiment. By way of illustration and not limitation, transmit protocol stacks 620, 670 may include respective PMCs 631, 651 each to perform a corresponding ITP modification according to method 200.

During test mode operation, a loopback path 662 of link controller 660 may communicate to receive protocol stack 680 signals 666 which are based on an input from transmit protocol stack 620. Such an input may include some or all of transaction packet (TP) information 630 to control the flow of data packets, data packet header (DPH) information 632 which encapsulates payload data, and data packet data (DPD) information 634 comprising the payload data. Alternatively or in addition, the input from transmit protocol stack 620 may include link management packet (LMP) information 636 to implement link management mechanisms and/or isochronous timestamp packet (ITP) information 638 which is broadcast on currently-active links.

Test mode operation may further include a loopback path 664 communicating to receive protocol stack 670 signals 668 which are based on an input from transmit protocol stack 640. Similar to transmit protocol stack 620, transmit protocol stack 640 may input some or all of TP information 650, DPH information 652, DPD information 654, LMP information 656 and ITP information 658.

Security aggregator may be coupled to variously accumulate TP signature information based on some or all of TP information 630, 650, to accumulate DHP signature information based on some or all of DHP information 632, 652 and/or other such signature information which is specific to different classes of packet information. Some or all such signature information may be variously compared or otherwise evaluated based on predetermined "known-good" signatures to test whether and/or how resources of IC chip 600 might fail one or more tests. The provisioning of known-good signatures, and the evaluation of IC resources based on such known-good signature, may include operations adapted from conventional test evaluation processing, which are not detailed herein to avoid obscuring features of various embodiments.

Figure 7:
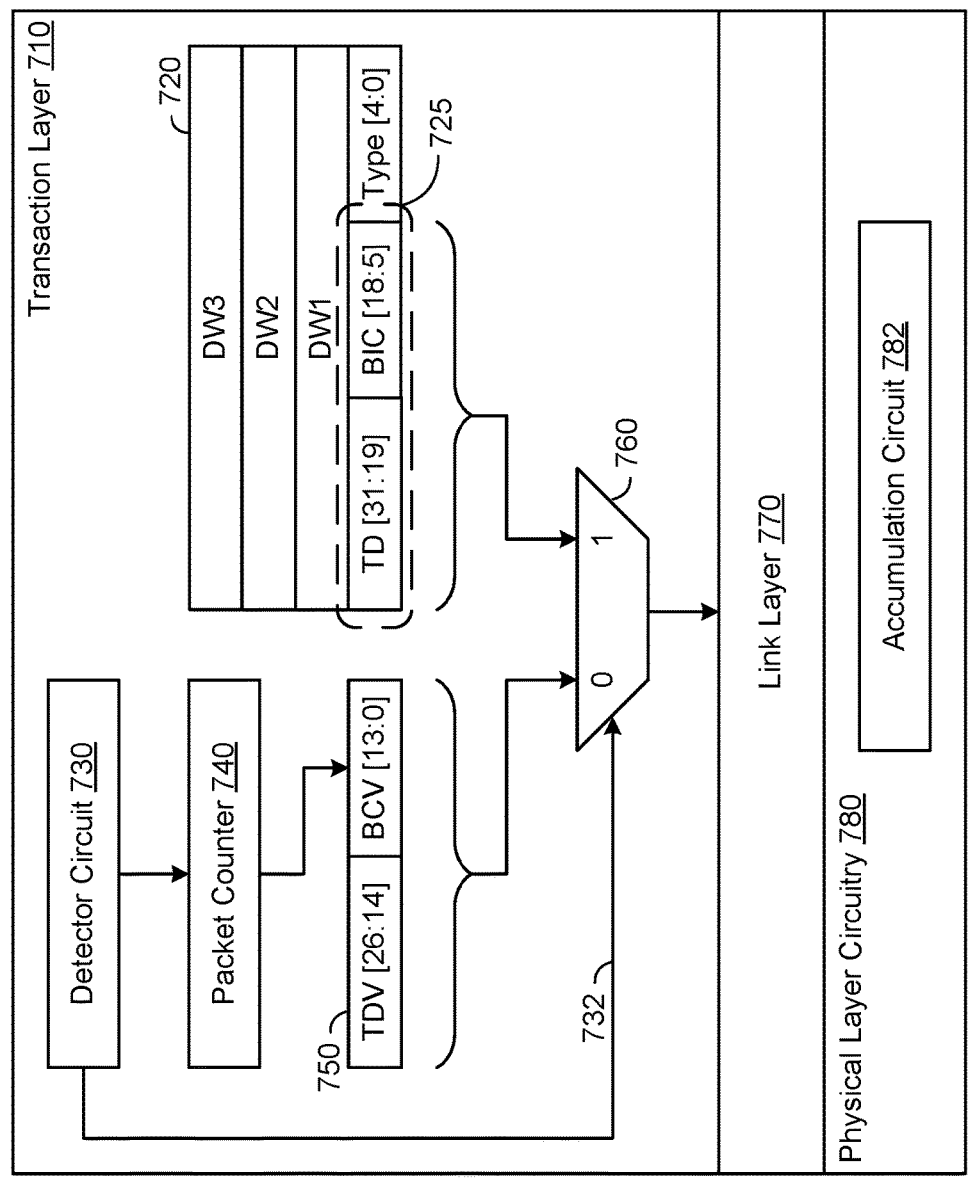
FIG. 7 is a block diagram illustrating elements of a protocol stack including packet modification circuitry according to an embodiment.

FIG. 7 shows features of a protocol stack 700 to provide packet modification functionality according to an embodiment. Protocol stack 700 may reside in protocol stack logic 150, protocol stack logic 450 or any of a variety of other such IC chip components—e.g., wherein protocol stack 700 includes one of transmit protocol stacks 620, 640. In an embodiment, protocol stack 700 operates to perform some or all of method 200.

In the illustrative embodiment shown, protocol stack 700 includes a transaction layer 710 that, for example, supports communication according to a standard USB protocol. Transaction layer 710 may be coupled to receive a packet such as the illustrative ITP 720 shown. A detector circuit 730 of transaction layer 710 may snoop, parse and/or otherwise detect ITP 720 to identify that a format of ITP 720 conforms to a standard ITP format. For example, detector circuit 730 may detect that a 5-bit type field of ITP 720—the field represented as Type[4:0]—stores a ITP type identifier value.

In response to detecting that ITP 720 is of an ITP packet type, detector circuit 730 may generate signaling to selectively replace the respective values in one or more fields of ITP 720 with other information to facilitate a subsequent generation of signature information. By way of illustration and not limitation, packet modification circuitry of transaction layer 710 may include the illustrative multiplexer (MUX) circuit 760 to selectively replace only a subset of all values of ITP 720 with one or more substitute values. In the example embodiment shown, non-deterministic data 725 of ITP 720 includes a value at a time delta field TD[31:19] and/or a value at a bus interval counter field BIC[18:5].

Responsive to a signal 732 from detector circuit 730 (indicating an ITP packet type of ITP 720), MUX circuit 760 may selectively replace a value at TD[31:19] with a substitute value TDV[26:14] that, for example, is stored at a register 750. Alternatively or in addition, MUX circuit 760 may (responsive to a signal 732) selectively replace a value at BIC[18:5] with a substitute value BCV[13:0] from register 750. In one embodiment, BCV[13:0] is updated by a packet counter 740 which, in turn, is responsive to packet type detection functionality such as that of detector circuit 730. After processing with MUX circuitry 760, the modified version of ITP 720 may be communicated through one or more other protocol stack layers. For example, the modified packet may be communicated through a link layer 770 of protocol stack 700 to physical layer circuitry 780 which includes an accumulation circuit 782.

Packet information such as the modified version of ITP 720 may be processed (e.g., snooped) by accumulation circuit 782 to extract, calculate or otherwise determine signature information for later evaluation. Such signature information may include or otherwise be based on the one or more substitute values which were added using MUX circuitry 760. In one embodiment, the signature information is communicated from accumulation circuit 782 to security aggregator 610, TC 142 and/or other logic of the IC chip—e.g., where such communication is via a sideband channel (not shown). The signature information may then be evaluated based on fiducial information, corresponding to known-good circuit performance, to detect for a pass (or failure) of a circuit test.

Figure 8:
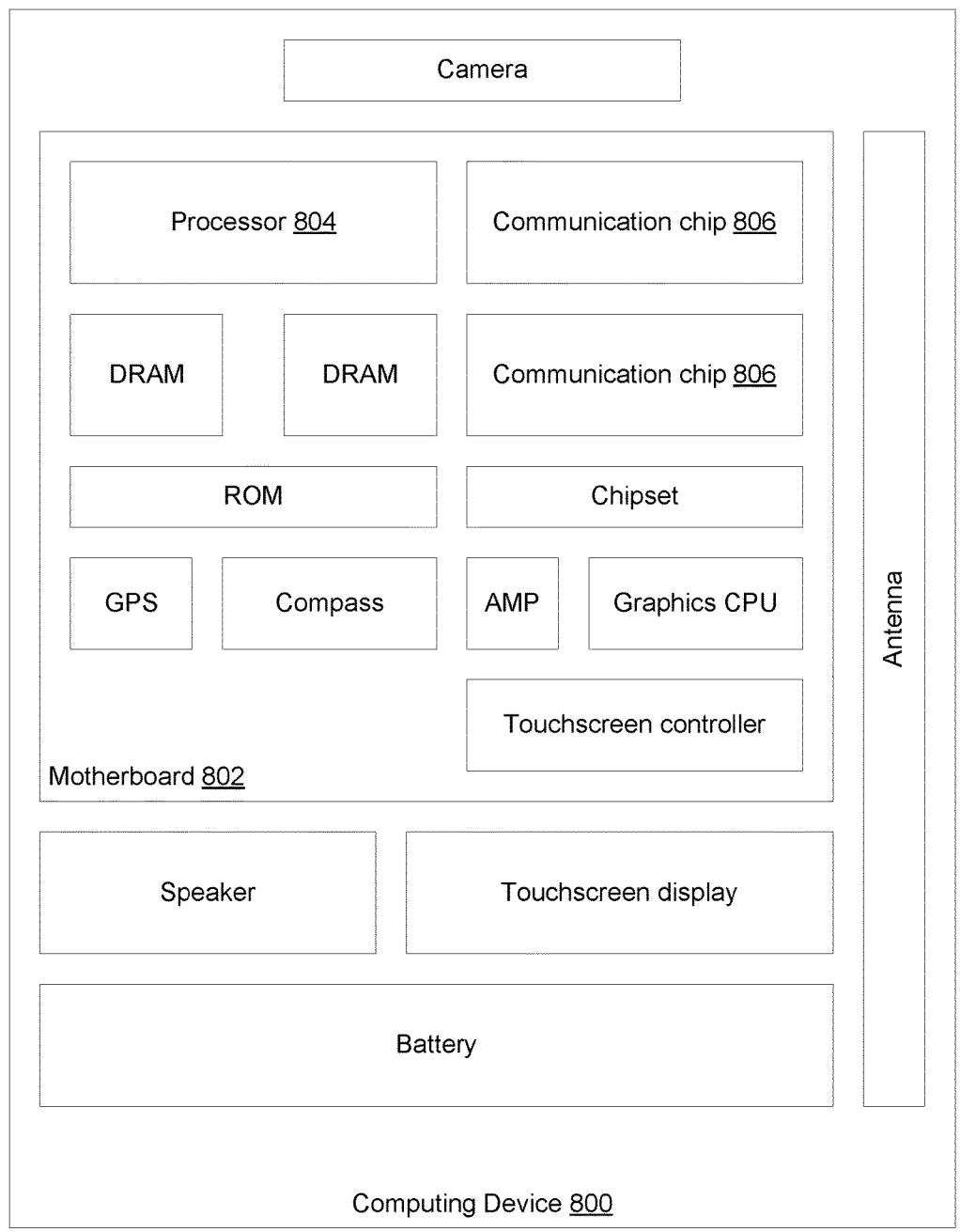
FIG. 8 is a functional block diagram illustrating elements of a computing device according to an embodiment.

FIG. 8 illustrates a computing device 800 in accordance with one embodiment. The computing device 800 houses a board 802. The board 802 may include a number of components, including but not limited to a processor 804 and at least one communication chip 806. The processor 804 is physically and electrically coupled to the board 802. In some implementations the at least one communication chip 806 is also physically and electrically coupled to the board 802. In further implementations, the communication chip 806 is part of the processor 804.

Depending on its applications, computing device 800 may include other components that may or may not be physically and electrically coupled to the board 802. These other components include, but are not limited to, volatile memory (e.g., DRAM), non-volatile memory (e.g., ROM), flash memory, a graphics processor, a digital signal processor, a crypto processor, a chipset, an antenna, a display, a touchscreen display, a touchscreen controller, a battery, an audio codec, a video codec, a power amplifier, a global positioning system (GPS) device, a compass, an accelerometer, a gyroscope, a speaker, a camera, and a mass storage device (such as hard disk drive, compact disk (CD), digital versatile disk (DVD), and so forth).

The communication chip 806 enables wireless communications for the transfer of data to and from the computing device 800. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication chip 806 may implement any of a number of wireless standards or protocols, including but not limited to Wi-Fi (IEEE 802.11 family), WiMAX (IEEE 802.16 family), IEEE 802.20, long term evolution (LTE), Ev-DO, HSPA+, HSDPA+, HSUPA+, EDGE, GSM, GPRS, CDMA, TDMA, DECT, Bluetooth, derivatives thereof, as well as any other wireless protocols that are designated as 3G, 4G, 5G, and beyond. The computing device 800 may include a plurality of communication chips 806. For instance, a first communication chip 806 may be dedicated to shorter range wireless communications such as Wi-Fi and Bluetooth and a second communication chip 806 may be dedicated to longer range wireless communications such as GPS, EDGE, GPRS, CDMA, WiMAX, LTE, Ev-DO, and others.

The processor 804 of the computing device 800 includes an integrated circuit die packaged within the processor 804. The term "processor" may refer to any device or portion of a device that processes electronic data from registers and/or memory to transform that electronic data into other electronic data that may be stored in registers and/or memory. The communication chip 806 also includes an integrated circuit die packaged within the communication chip 806.

In various implementations, the computing device 800 may be a laptop, a netbook, a notebook, an ultrabook, a smartphone, a tablet, a personal digital assistant (PDA), an ultra mobile PC, a mobile phone, a desktop computer, a server, a printer, a scanner, a monitor, a set-top box, an entertainment control unit, a digital camera, a portable music player, or a digital video recorder. In further implementations, the computing device 800 may be any other electronic device that processes data.

Some embodiments may be provided as a computer program product, or software, that may include a machine-readable medium having stored thereon instructions, which may be used to program a computer system (or other electronic devices) to perform a process according to an embodiment. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., infrared signals, digital signals, etc.)), etc.

Figure 9:
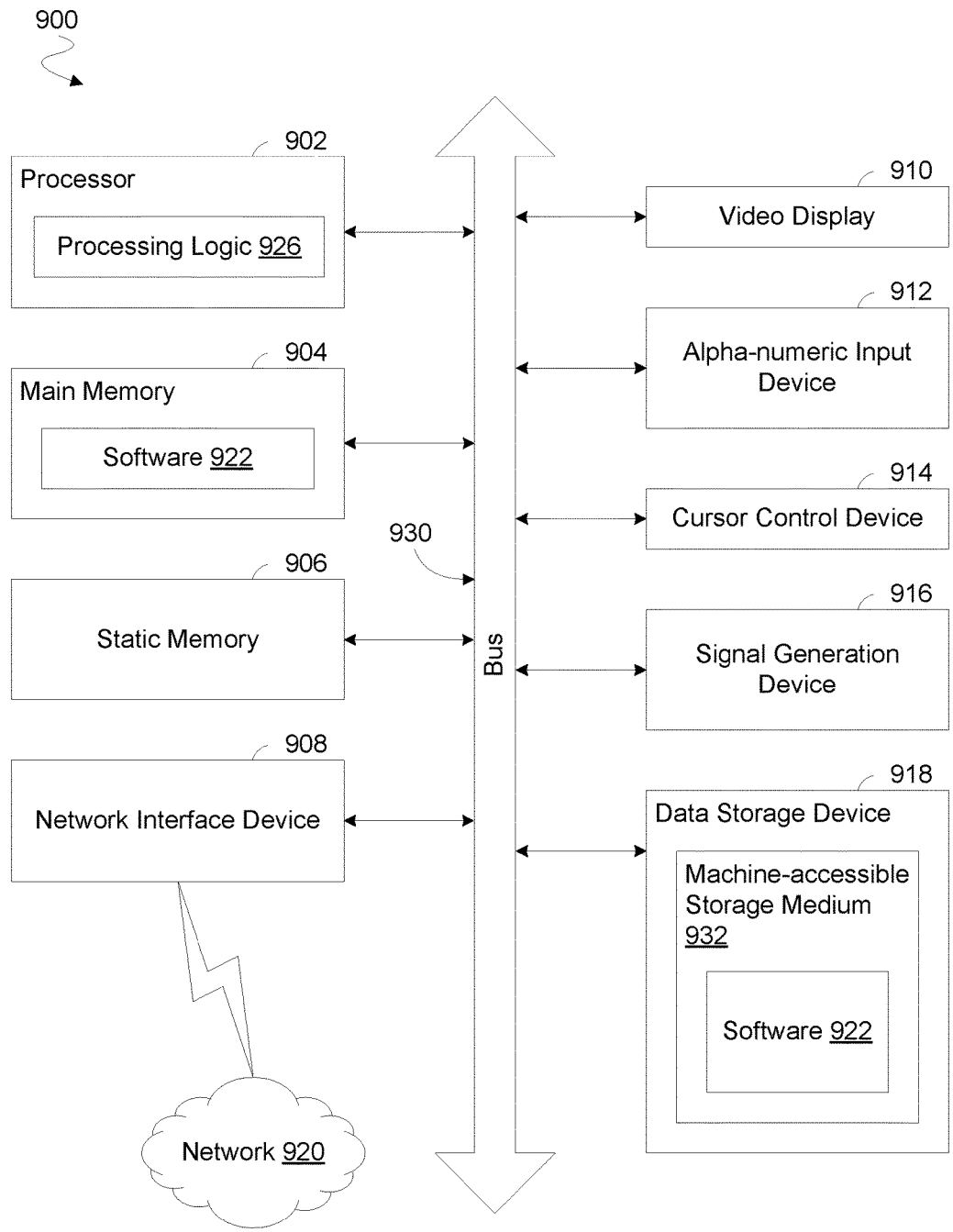
FIG. 9 is a functional block diagram illustrating elements of a computer system according to an embodiment.

FIG. 9 illustrates a diagrammatic representation of a machine in the exemplary form of a computer system 900 within which a set of instructions, for causing the machine to perform any one or more of the methodologies described herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies described herein.

The exemplary computer system 900 includes a processor 902, a main memory 904 (e.g., read-only memory (ROM), flash memory, dynamic random access memory (DRAM) such as synchronous DRAM (SDRAM) or Rambus DRAM (RDRAM), etc.), a static memory 906 (e.g., flash memory, static random access memory (SRAM), etc.), and a secondary memory 918 (e.g., a data storage device), which communicate with each other via a bus 930.

Processor 902 represents one or more general-purpose processing devices such as a microprocessor, central processing unit, or the like. More particularly, the processor 902 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 902 may also be one or more special-purpose processing devices such as an application specific integrated circuit (ASIC), a field programmable gate array (FPGA), a digital signal processor (DSP), network processor, or the like. Processor 902 is configured to execute the processing logic 926 for performing the operations described herein.

The computer system 900 may further include a network interface device 908. The computer system 900 also may include a video display unit 910 (e.g., a liquid crystal display (LCD), a light emitting diode display (LED), or a cathode ray tube (CRT)), an alphanumeric input device 912 (e.g., a keyboard), a cursor control device 914 (e.g., a mouse), and a signal generation device 916 (e.g., a speaker).

The secondary memory 918 may include a machine-accessible storage medium (or more specifically a computer-readable storage medium) 932 on which is stored one or more sets of instructions (e.g., software 922) embodying any one or more of the methodologies or functions described herein. The software 922 may also reside, completely or at least partially, within the main memory 904 and/or within the processor 902 during execution thereof by the computer system 900, the main memory 904 and the processor 902 also constituting machine-readable storage media. The software 922 may further be transmitted or received over a network 920 via the network interface device 908.

While the machine-accessible storage medium 932 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any of one or more embodiments. The term "machine-readable storage medium" shall accordingly be taken to include, but not be limited to, solid-state memories, and optical and magnetic media.

In another implementation, an integrated circuit (IC) chip comprises a first protocol stack including a first layer to receive a first packet, the first layer including a detector circuit configured to identify an isochronous timestamp packet (ITP) type of the first packet, and multiplexer (MUX) circuitry, coupled to the detector circuit, to generate a modified first packet in response to identification of the ITP type, including the MUX circuitry to selectively replace a first value at a first portion of the first packet with a second value. The first layer is further to communicate the modified first packet through one or more layers of the first protocol stack.

In one embodiment, the first portion includes a time delta field which represents an amount of time that has elapsed since a receipt of another packet. In another embodiment, the first portion includes a bus interval counter field. In another embodiment, the first layer of the first protocol stack is a transaction layer of the first protocol stack. In another embodiment, the first protocol stack further comprises a second layer to receive the modified first packet, the second layer comprising an accumulation circuit configured to determine signature information based on the second value, wherein a performance of the first protocol stack is to be evaluated based on the signature information. In another embodiment, the second layer to provide physical layer functionality of a standard Universal Serial Bus protocol stack. In another embodiment, the IC chip further comprises a second protocol stack including a third layer to receive a second packet, wherein a reply to the first packet includes the second packet, the third layer comprising circuitry configured to identify an ITP type of the second packet, generate a modified second packet in response to identification of the ITP type of the second packet, including the third layer to selectively replace a third value at a third portion of the second packet with a fourth value, and communicate the modified second packet through one or more layers of the second protocol stack. In another embodiment, the first protocol stack is to communicate multiple packets, including the ITP packet, to verify a firmware version of the IC chip.

In another implementation, a method at an integrated circuit (IC) chip comprises receiving a first packet at a first layer of a first protocol stack, identifying an isochronous timestamp packet (ITP) type of the first packet, and in response to identifying the ITP type, selectively replacing a first value at a first portion of the first packet with a second value to generate a modified first packet. The method further comprises communicating the modified first packet through one or more layers of the first protocol stack.

In one embodiment, the first portion includes a time delta field representing an amount of time that has elapsed since a receipt of another packet. In another embodiment, the first portion includes a bus interval counter field. In another embodiment, the first layer of the first protocol stack is a transaction layer of the first protocol stack. In another embodiment, the method further comprises receiving the modified first packet at a second layer of the first protocol stack, and generating, at the second layer, signature information based on the second value, wherein a performance of the first protocol stack is evaluated based on the signature information. In another embodiment, the second layer provides physical layer functionality of a standard Universal Serial Bus protocol stack. In another embodiment, the method further comprises receiving a second packet at a third layer of a second protocol stack, wherein a third portion of the second packet includes a third value, wherein a reply to the first packet includes the second packet, identifying an ITP type of the second packet, and in response to identifying the ITP type of the second packet, selectively replacing a third value of the third portion with a fourth value to generate a modified second packet, where the method further comprises communicating the modified second packet through one or more layers of the second protocol stack. In another embodiment, multiple packets including the ITP packet are communicated to verify a firmware version of the IC chip.

In another implementation, a system comprises an integrated circuit (IC) chip including a first protocol stack including a first layer to receive a first packet, the first layer including a detector circuit configured to identify an isochronous timestamp packet (ITP) type of the first packet, and multiplexer (MUX) circuitry, coupled to the detector circuit, to generate a modified first packet in response to identification of the ITP type, including the MUX circuitry to selectively replace a first value at a first portion of the first packet with a second value. The first layer is further to communicate the modified first packet through one or more layers of the first protocol stack. The system further comprises a display device coupled to the IC chip, the display device to display an image based on signals exchanged with the IC chip.

In one embodiment, the first portion includes a time delta field which represents an amount of time that has elapsed since a receipt of another packet. In another embodiment, the first portion includes a bus interval counter field. In another embodiment, the first layer of the first protocol stack is a transaction layer of the first protocol stack. In another embodiment, the first protocol stack further comprises a second layer to receive the modified first packet, the second layer comprising an accumulation circuit configured to determine signature information based on the second value, wherein a performance of the first protocol stack is to be evaluated based on the signature information. In another embodiment, the second layer is to provide physical layer functionality of a standard Universal Serial Bus protocol stack. In another embodiment, the IC chip further comprises a second protocol stack including a third layer to receive a second packet, wherein a reply to the first packet includes the second packet, the third layer comprising circuitry configured to identify an ITP type of the second packet, generate a modified second packet in response to identification of the ITP type of the second packet, including the third layer to selectively replace a third value at a third portion of the second packet with a fourth value, and communicate the modified second packet through one or more layers of the second protocol stack. In another embodiment, the first protocol stack is to communicate multiple packets, including the ITP packet, to verify a firmware version of the IC chip.

Techniques and architectures for testing integrated circuitry are described herein. In the above description, for purposes of explanation, numerous specific details are set forth in order to provide a thorough understanding of certain embodiments. It will be apparent, however, to one skilled in the art that certain embodiments can be practiced without these specific details. In other instances, structures and devices are shown in block diagram form in order to avoid obscuring the description.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description herein are presented in terms of algorithms and symbolic representations of operations on data bits within a computer memory. These algorithmic descriptions and representations are the means used by those skilled in the computing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Certain embodiments also relate to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs) such as dynamic RAM (DRAM), EPROMs, EEPROMs, magnetic or optical cards, or any type of media suitable for storing electronic instructions, and coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description herein. In addition, certain embodiments are not described with reference to any particular programming language. It will be appreciated that a variety of programming languages may be used to implement the teachings of such embodiments as described herein.

Besides what is described herein, various modifications may be made to the disclosed embodiments and implementations thereof without departing from their scope. Therefore, the illustrations and examples herein should be construed in an illustrative, and not a restrictive sense. The scope of the invention should be measured solely by reference to the claims that follow.

What is claimed is:

1. An integrated circuit (IC) chip comprising: a first protocol stack including a first layer to receive a first packet, the first layer including:
   a detector circuit configured to identify an isochronous timestamp packet (ITP) type of the first packet; and
   multiplexer (MUX) circuitry, coupled to the detector circuit, to generate a modified first packet in response to identification of the ITP type, including the MUX circuitry to selectively replace a first value at a first portion of the first packet with a second value; the first layer further to communicate the modified first packet through one or more layers of the first protocol stack.

2. The IC chip of claim 1, wherein the first portion includes a time delta field which represents an amount of time that has elapsed since a receipt of another packet.

3. The IC chip of claim 1, wherein the first portion includes a bus interval counter field.

4. The IC chip of claim 1, wherein the first layer of the first protocol stack is a transaction layer of the first protocol stack.

5. The IC chip of claim 1, the first protocol stack further comprising:
   a second layer to receive the modified first packet, the second layer comprising an accumulation circuit configured to determine signature information based on the second value, wherein a performance of the first protocol stack is to be evaluated based on the signature information.

6. The IC chip of claim 5, wherein the second layer to provide physical layer functionality of a standard Universal Serial Bus protocol stack.

7. The IC chip of claim 1, further comprising a second protocol stack including a third layer to receive a second packet, wherein a reply to the first packet includes the second packet, the third layer comprising circuitry configured to:
   identify an ITP type of the second packet; generate a modified second packet in response to identification of the ITP type of the second packet, including the third layer to selectively replace a third value at a third portion of the second packet with a fourth value; and communicate the modified second packet through one or more layers of the second protocol stack.

8. The IC chip of claim 1, wherein the first protocol stack to communicate multiple packets, including the ITP packet, to verify a firmware version of the IC chip.

9. A method at an integrated circuit (IC) chip, the method comprising:
- receiving a first packet at a first layer of a first protocol stack;
- identifying an isochronous timestamp packet (ITP) type of the first packet;
- in response to identifying the ITP type, selectively replacing a first value at a first portion of the first packet with a second value to generate a modified first packet; and
- communicating the modified first packet through one or more layers of the first protocol stack.

10. The method of claim 9, wherein the first portion includes a time delta field representing an amount of time that has elapsed since a receipt of another packet.

11. The method of claim 9, wherein the first portion includes a bus interval counter field.

12. The method of claim 9, wherein the first layer of the first protocol stack is a transaction layer of the first protocol stack.

13. The method of claim 9, further comprising:
- receiving the modified first packet at a second layer of the first protocol stack; and
- generating, at the second layer, signature information based on the second value, wherein a performance of the first protocol stack is evaluated based on the signature information.

14. The method of claim 13, wherein the second layer provides physical layer functionality of a standard Universal Serial Bus protocol stack.

15. The method of claim 9, further comprising:
- receiving a second packet at a third layer of a second protocol stack, wherein a third portion of the second packet includes a third value, wherein a reply to the first packet includes the second packet;
- identifying an ITP type of the second packet;
- in response to identifying the ITP type of the second packet, selectively replacing a third value of the third portion with a fourth value to generate a modified second packet; and
- communicating the modified second packet through one or more layers of the second protocol stack.

16. The method of claim 9, wherein multiple packets including the ITP packet are communicated to verify a firmware version of the IC chip.

17. A system comprising: an integrated circuit (IC) chip including:
- a first protocol stack including a first layer to receive a first packet, the first layer including: a detector circuit configured to identify an isochronous timestamp packet (ITP) type of the first packet; and multiplexer (MUX) circuitry, coupled to the detector circuit, to generate a modified first packet in response to identification of the ITP type, including the MUX circuitry to selectively replace a first value at a first portion of the first packet with a second value;
- the first layer further to communicate the modified first packet through one or more layers of the first protocol stack; and
- a display device coupled to the IC chip, the display device to display an image based on signals exchanged with the IC chip.

18. The IC chip of claim 17, wherein the first portion includes a time delta field which represents an amount of time that has elapsed since a receipt of another packet.

19. The IC chip of claim 17, wherein the first portion includes a bus interval counter field.

20. The IC chip of claim 17, wherein the first layer of the first protocol stack is a transaction layer of the first protocol stack.

21. The IC chip of claim 17, the first protocol stack further comprising: a second layer to receive the modified first packet, the second layer comprising an accumulation circuit configured to determine signature information based on the second value, wherein a performance of the first protocol stack is to be evaluated based on the signature information.

* * * * *